(12) United States Patent
Waku et al.

(10) Patent No.: US 9,643,577 B2
(45) Date of Patent: May 9, 2017

(54) VEHICLE CONTROL DEVICE AND VEHICLE CONTROL METHOD

(71) Applicant: JATCO Ltd, Fuji-shi, Shizuoka (JP)

(72) Inventors: Kousuke Waku, Hadano (JP); Hideshi Wakayama, Hadano (JP); Noritaka Aoyama, Okazaki (JP)

(73) Assignee: JATCO Ltd, Fuji-Shi (JP)

( * ) Notice: Subject to any disclaimer, the term of this patent is extended or adjusted under 35 U.S.C. 154(b) by 0 days.

(21) Appl. No.: 14/406,901

(22) PCT Filed: May 28, 2013

(86) PCT No.: PCT/JP2013/064682
§ 371 (c)(1),
(2) Date: Dec. 10, 2014

(87) PCT Pub. No.: WO2013/187221
PCT Pub. Date: Dec. 19, 2013

(65) Prior Publication Data
US 2015/0142286 A1 May 21, 2015

(30) Foreign Application Priority Data
Jun. 11, 2012 (JP) .................................. 2012-131722

(51) Int. Cl.
*G08G 1/01* (2006.01)
*B60T 8/17* (2006.01)
(Continued)

(52) U.S. Cl.
CPC ................ *B60T 8/17* (2013.01); *B60T 7/122* (2013.01); *B60T 17/22* (2013.01);
(Continued)

(58) Field of Classification Search
CPC ...... B60T 8/17; B60T 7/22; B60W 30/18018; F02D 29/02; F16H 61/0031
(Continued)

(56) References Cited

U.S. PATENT DOCUMENTS 8,382,642 B2 2/2013 Saito et al.
8,626,426 B2 1/2014 Ohmori et al.
(Continued)

FOREIGN PATENT DOCUMENTS

JP 2003-154926 A 5/2003
JP 2003154926 A * 5/2003
(Continued)

OTHER PUBLICATIONS

English translation of JP 2003154926 A.*

*Primary Examiner* — Yazan Soofi
(74) *Attorney, Agent, or Firm* — Foley & Lardner LLP

(57) ABSTRACT

A vehicle control device controls a vehicle that has an electric oil pump, executes idling stop control for stopping a drive source when predetermined conditions are satisfied, and is capable of applying a braking force in a state where a brake pedal is released. The vehicle control device determines whether or not the vehicle is stopped, determines whether or not the electric oil pump is driven, and executes the idling stop control when stop of the vehicle is determined, driving of the electric oil pump is determined, and the braking force is applied to the vehicle. Application of the braking force is started after the vehicle is determined to be stopped and the electric oil pump is determined to be driven.

5 Claims, 8 Drawing Sheets

(51) Int. Cl.
  *B60T 17/22* (2006.01)
  *B60W 30/18* (2012.01)
  *B60T 7/12* (2006.01)
  *F02D 29/02* (2006.01)
  *F16H 61/00* (2006.01)

(52) U.S. Cl.
  CPC ....... *B60W 30/18018* (2013.01); *F02D 29/02* (2013.01); *F16H 61/0031* (2013.01); *B60T 2201/06* (2013.01); *B60W 2520/04* (2013.01); *B60W 2540/12* (2013.01); *B60Y 2300/45* (2013.01); *F16H 2312/14* (2013.01)

(58) Field of Classification Search
  USPC .......................... 477/77, 182; 701/53, 54, 70
  See application file for complete search history.

(56) References Cited

U.S. PATENT DOCUMENTS

| | | | |
|---|---|---|---|
| 8,758,197 B2 | 6/2014 | Kamada et al. | |
| 8,834,321 B2 | 9/2014 | Saito et al. | |
| 8,998,774 B2* | 4/2015 | Yu et al. | 477/203 |
| 2003/0045988 A1* | 3/2003 | Suzuki | B60K 6/485 |
| | | | 701/54 |
| 2011/0256980 A1 | 10/2011 | Saito et al. | |
| 2011/0256981 A1 | 10/2011 | Saito et al. | |
| 2011/0276240 A1* | 11/2011 | Fujiwara | F16H 61/0021 |
| | | | 701/59 |
| 2011/0319227 A1 | 12/2011 | Kamada et al. | |
| 2012/0022773 A1 | 1/2012 | Ohmori et al. | |
| 2013/0297161 A1* | 11/2013 | Gibson et al. | 701/54 |

FOREIGN PATENT DOCUMENTS

| | | |
|---|---|---|
| JP | 2009-190648 A | 8/2009 |
| JP | 2011-226315 A | 11/2011 |
| JP | 2011-226316 A | 11/2011 |
| JP | 2012-025193 A | 2/2012 |
| JP | 2012-030779 A | 2/2012 |

\* cited by examiner

VEHICLE CONTROL DEVICE AND VEHICLE CONTROL METHOD

TECHNICAL FIELD

The present invention relates to a vehicle control device and a vehicle control method.

BACKGROUND ART

JP 2012-30779A discloses a conventional technique to execute idling stop control for automatically stopping an engine when a vehicle comes to a stop, and supply a hydraulic pressure necessary for the vehicle using an electric oil pump during the idling stop control.

A technique to perform so-called hill-hold is also known. According to the hill-hold, a predetermined braking force is generated even if depression of a brake pedal is cancelled during the idling stop control. By performing the hill-hold, for example, a vehicle stopped on a climbing road can be suppressed from rolling down backward when starting the vehicle by ceasing the idling stop control.

SUMMARY OF INVENTION

With these techniques, a vehicle can generate a braking force by performing the hill-hold while supplying a hydraulic pressure using an electric oil pump during the idling stop control.

The idling stop control according to the above-described techniques is executed after confirming that the electric oil pump is able to supply the hydraulic pressure and that the vehicle is generating the braking force due to the hill-hold.

A drive confirmation time period necessary for confirming that the electric oil pump is able to supply the hydraulic pressure is not the same as a generation confirmation time period necessary for confirming that the vehicle is generating the braking force due to the hill-hold. The drive confirmation time period is longer than the generation confirmation time period. The hill-hold is performed only by closing a drain circuit for a brake fluid pressure, and a time period required to close the drain circuit is short. Therefore, the generation confirmation time period is short. On the other hand, the electric oil pump is determined to be able to supply a necessary hydraulic pressure, for example, after a discharge pressure of the electric oil pump has increased to a predetermined value, or after a predetermined time period has elapsed since the initiation of the electric oil pump. This is why the drive confirmation time period is longer than the generation confirmation time period.

In this case, if the supply of the hydraulic pressure using the electric oil pump and the hill-hold are started at the same timing, the vehicle generates the braking force due to the hill-hold while confirming that the electric oil pump is able to supply the hydraulic pressure.

In this state, if a driver places a brake pedal in a released state and depresses an accelerator pedal before the elapse of the drive confirmation time period, the vehicle starts without executing the idling stop control. However, when the accelerator pedal is depressed, the vehicle is generating the braking force due to the hill-hold. The start of a decrease in the braking force is delayed by a sum total of a time period for determining the deactivation of the hill-hold and a time period of operation of deactivating the hill-hold. Therefore, startability of the vehicle undesirably declines due to the action of the braking force, even though the accelerator pedal is depressed while an engine is in a continuously-driven state.

The present invention has been made to solve the foregoing problem, and aims to improve startability of a vehicle in a case where an accelerator pedal is depressed between when the vehicle comes to a stop and when idling stop control is executed.

A vehicle control device according to one aspect of the present invention controls a vehicle that has an electric oil pump and executes idling stop control for stopping a drive source when predetermined conditions are satisfied. The vehicle control device includes: vehicle stop determination means for determining whether or not the vehicle is stopped; drive determination means for determining whether or not the electric oil pump is driven; braking force control means capable of applying a braking force to the vehicle in a state where a brake pedal is released; and idling stop control means for executing the idling stop control when stop of the vehicle is determined by the vehicle stop determination means, driving of the electric oil pump is determined by the drive determination means, and the braking force is applied by the braking force control means to the vehicle. The braking force control means starts application of the braking force to the vehicle after the vehicle is determined to be stopped and the electric oil pump is determined to be driven.

A vehicle control method according to another aspect of the present invention controls a vehicle that has an electric oil pump, executes idling stop control for stopping a drive source when predetermined conditions are satisfied, and is capable of applying a braking force in a state where a brake pedal is released. The vehicle control method includes: determining whether or not the vehicle is stopped; determining whether or not the electric oil pump is driven; and executing the idling stop control when stop of the vehicle is determined, driving of the electric oil pump is determined, and the braking force is applied to the vehicle. Application of the braking force is started after the vehicle is determined to be stopped and the electric oil pump is determined to be driven.

According to these aspects, the braking force control means applies the braking force to the vehicle when a brake pedal is placed in a released state after the vehicle comes to a stop and the electric oil pump is driven. In this way, in a case where an accelerator pedal is depressed between when the vehicle comes to a stop and when the braking force is applied by the braking force control means, the braking force is not generated by the braking force control means. This prevents the start of a decrease in the braking force from being delayed by a sum total of a time period for determining the deactivation the braking force generated by the braking force control means and a time period of operation of deactivating the braking force generated by the braking force control means. Hence, the braking force decreases as the brake pedal is released. This makes it possible to start the vehicle in response to depression of the accelerator pedal, and to improve startability of the vehicle.

DESCRIPTION OF EMBODIMENTS

A present embodiment of the present invention will be described below with reference to the attached drawings. It should be noted that, in the following description, a "speed ratio" of a certain transmission mechanism is a value obtained by dividing an input rotation speed of the transmission mechanism by an output rotation speed of the transmission mechanism. Also, the "lowest speed ratio" denotes a maximum speed ratio of the transmission mechanism used when, for example, starting a vehicle. The "highest speed ratio" denotes a minimum speed ratio of the transmission mechanism.

Figure 1:
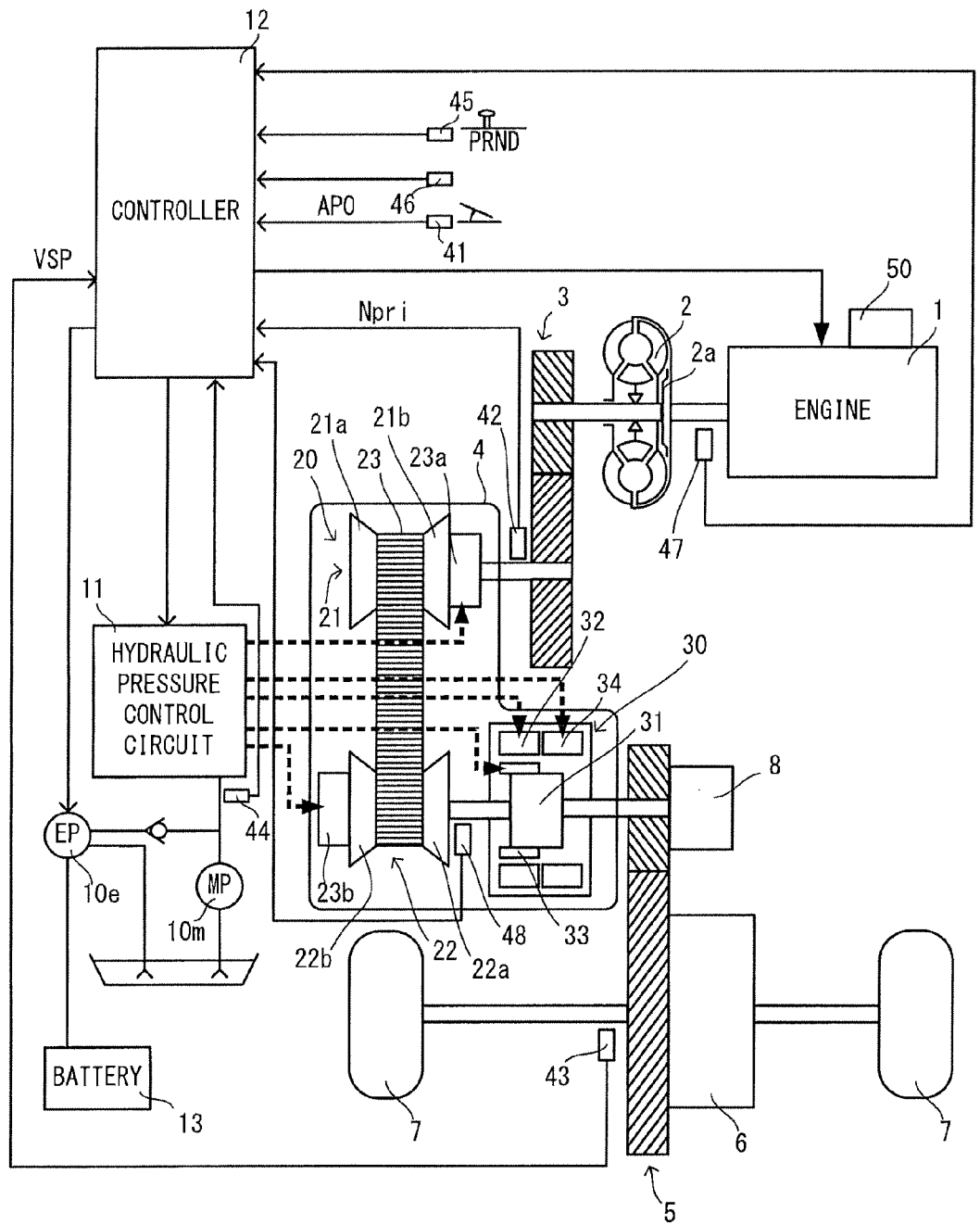
FIG. 1 shows a general configuration of a vehicle according to a present embodiment.

FIG. 1 shows a general configuration of a vehicle according to the present embodiment of the present invention. This vehicle includes an engine 1 as a drive source, and output rotation of the engine 1 is transmitted to drive wheels 7 via a torque converter 2 provided with a lock-up clutch 2a, a first gear train 3, a continuously variable transmission (hereinafter simply referred to as a "transmission 4"), a second gear train 5, and a differential device 6. The second gear train 5 is provided with a parking mechanism 8 that mechanically locks an output shaft of the transmission 4 in a non-rotatable manner at the time of parking. The vehicle also includes a starter 50 that initiates the engine 1 by rotating a crankshaft of the engine 1.

The transmission 4 is provided with a mechanical oil pump 10m to which rotation of the engine 1 is input and which is driven using a part of power of the engine 1, and an electric oil pump 10e which is driven by electric power supplied from a battery 13. The electric oil pump 10e is composed of an oil pump main body, an electric motor that rotates and drives the oil pump main body, and a motor driver, and can control a drive load either to match an arbitrary load or in multiple steps. The transmission 4 is also provided with a hydraulic pressure control circuit 11 that regulates a hydraulic pressure from the mechanical oil pump 10m or the electric oil pump 10e (hereinafter referred to as a "line pressure") and supplies the regulated hydraulic pressure to each component of the transmission 4.

The transmission 4 includes a belt-type continuously variable transmission mechanism (hereinafter referred to as a "variator 20") and an auxiliary transmission mechanism 30 arranged in series with the variator 20. It should be noted that "arranged in series" means that the variator 20 and the auxiliary transmission mechanism 30 are arranged in series on a power transmission path from the engine 1 to the drive wheels 7. The auxiliary transmission mechanism 30 may be connected directly to an output shaft of the variator 20 as in this example, and may be connected thereto via another transmission mechanism or power transmission mechanism (e.g., a gear train). Alternatively, the auxiliary transmission mechanism 30 may be connected to a stage preceding (an input shaft side of) the variator 20.

The variator 20 includes a primary pulley 21, a secondary pulley 22, and a V belt 23 wound around the pulleys 21 and 22. The pulleys 21 and 22 include fixed conical plates 21a and 22a, movable conical plates 21b and 22b, and hydraulic pressure cylinders 23a and 23b, respectively. The movable conical plates 21b and 22b are arranged with their sheave surfaces opposing the fixed conical plates 21a and 22a, respectively. In this way, a V groove is formed between the fixed conical plate 21a and the movable conical plate 21b, and between the fixed conical plate 22a and the movable conical plate 22b. The hydraulic cylinders 23a and 23b are provided on rear surfaces of the movable conical plates 21b and 22b so as to cause displacements of the movable conical plates 21b and 22b in a shaft direction, respectively. By adjusting a hydraulic pressure supplied to the hydraulic cylinders 23a and 23b, the width of the V groove changes, the radius of contact between the V belt 23 and the pulleys 21, 22 changes, and a speed ratio of the variator 20 continuously changes.

The auxiliary transmission mechanism 30 is a transmission mechanism with two forward positions and one reverse position. The auxiliary transmission mechanism 30 includes a Ravigneaux planetary gear mechanism 31, in which two planetary gear carriers are joined, and a plurality of friction engagement elements (a Low brake 32, a High clutch 33, and a Rev brake 34) that are connected to a plurality of rotation elements composing the Ravigneaux planetary gear mechanism 31 and change the states of linkage thereof. By changing the engaged/released state of each of the friction engagement elements 32 to 34 through adjustment of a hydraulic pressure supplied to each of the friction engagement elements 32 to 34, a gear position of the auxiliary transmission mechanism 30 is changed.

For example, by engaging the Low brake 32 and releasing the High clutch 33 and the Rev brake 34, the gear position of the auxiliary transmission mechanism 30 is placed in a first speed. By engaging the High clutch 33 and releasing the Low brake 32 and the Rev brake 34, the gear position of the auxiliary transmission mechanism 30 is placed in a second speed whose speed ratio is lower than the speed ratio of the first speed. By engaging the Rev brake 34 and releasing the Low brake 32 and the High clutch 33, the gear position of the auxiliary transmission mechanism 30 is placed in reverse. In the following description, the expression "the transmission 4 is in a low-speed mode" is used when the gear position of the auxiliary transmission mechanism 30 is placed in the first speed, and the expression "the transmission 4 is in a high-speed mode" is used when the gear position of the auxiliary transmission mechanism 30 is placed in the second speed.

Each of the friction engagement elements 32 to 34 is provided in a stage preceding or succeeding the variator 20 on the power transmission path. When one of the friction engagement elements 32 to 34 is engaged, power transmission of the transmission 4 is enabled. When all of the friction engagement elements 32 to 34 are released, power transmission of the transmission 4 is disabled.

Figure 2:
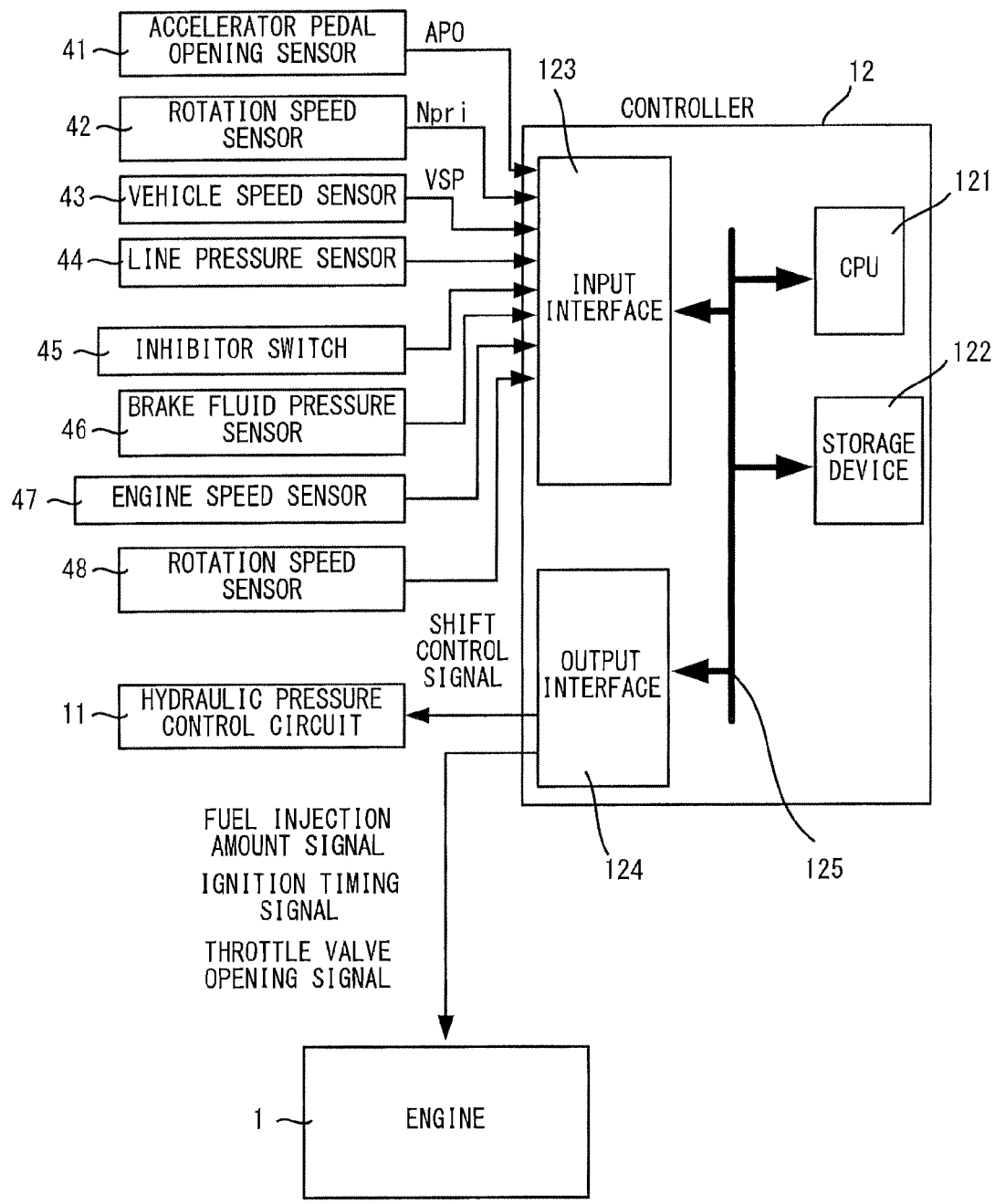
FIG. 2 shows a general configuration of a controller according to the present embodiment.

A controller 12 performs overall control of the engine 1 and the transmission 4. As shown in FIG. 2, the controller 12 is composed of a CPU 121, a storage device 122 made up of a RAM/ROM, an input interface 123, an output interface 124, and a bus 125 by which these components are connected to one another.

The following signals and the like are input to the input interface 123: an output signal from an accelerator pedal opening sensor 41 that detects an accelerator pedal opening APO, which is an amount of operation on an accelerator pedal; an output signal from a rotation speed sensor 42 that detects an input rotation speed of the transmission 4 (a rotation speed of the primary pulley 21); an output signal from a rotation speed sensor 48 that detects an output rotation speed of the transmission 4 (a rotation speed of the secondary pulley 22); an output signal from a vehicle speed sensor 43 that detects a vehicle speed VSP; an output signal from a line pressure sensor 44 that detects a line pressure; an output signal from an inhibitor switch 45 that detects a position of a selector lever; an output signal from a brake fluid pressure sensor 46 that detects a brake fluid pressure; and an output signal from an engine speed sensor 47 that detects a rotation speed of the crankshaft of the engine 1.

The storage device 122 stores a control program for the engine 1, a shift control program for the transmission 4, and various types of maps and tables used by these programs. The CPU 121 reads and executes the programs stored in the storage device 122, generates a fuel injection amount signal, an ignition timing signal, a throttle valve opening signal, a shift control signal, and a drive signal for the electric oil pump 10*e* by applying various types of computation processing to various types of signals input via the input interface 123, and outputs the generated signals to the engine 1, the hydraulic pressure control circuit 11, and the motor driver of the electric oil pump 10*e* via the output interface 124. Various types of values used by the CPU 121 in computation processing, as well as the results of computation, are stored in the storage device 122 as appropriate.

The hydraulic pressure control circuit 11 is composed of a plurality of flow paths and a plurality of hydraulic pressure control valves. Based on a shift control signal from the controller 12, the hydraulic pressure control circuit 11 switches among paths for supplying a hydraulic pressure by controlling the plurality of hydraulic pressure control valves. The hydraulic pressure control circuit 11 also prepares a necessary hydraulic pressure from a hydraulic pressure generated by the mechanical oil pump 10*m* or the electric oil pump 10*e* and supplies the prepared hydraulic pressure to each component of the transmission 4. In this way, the speed ratio of the variator 20 and the gear position of the auxiliary transmission mechanism 30 are changed, and shift of the transmission 4 is realized.

Figure 3:
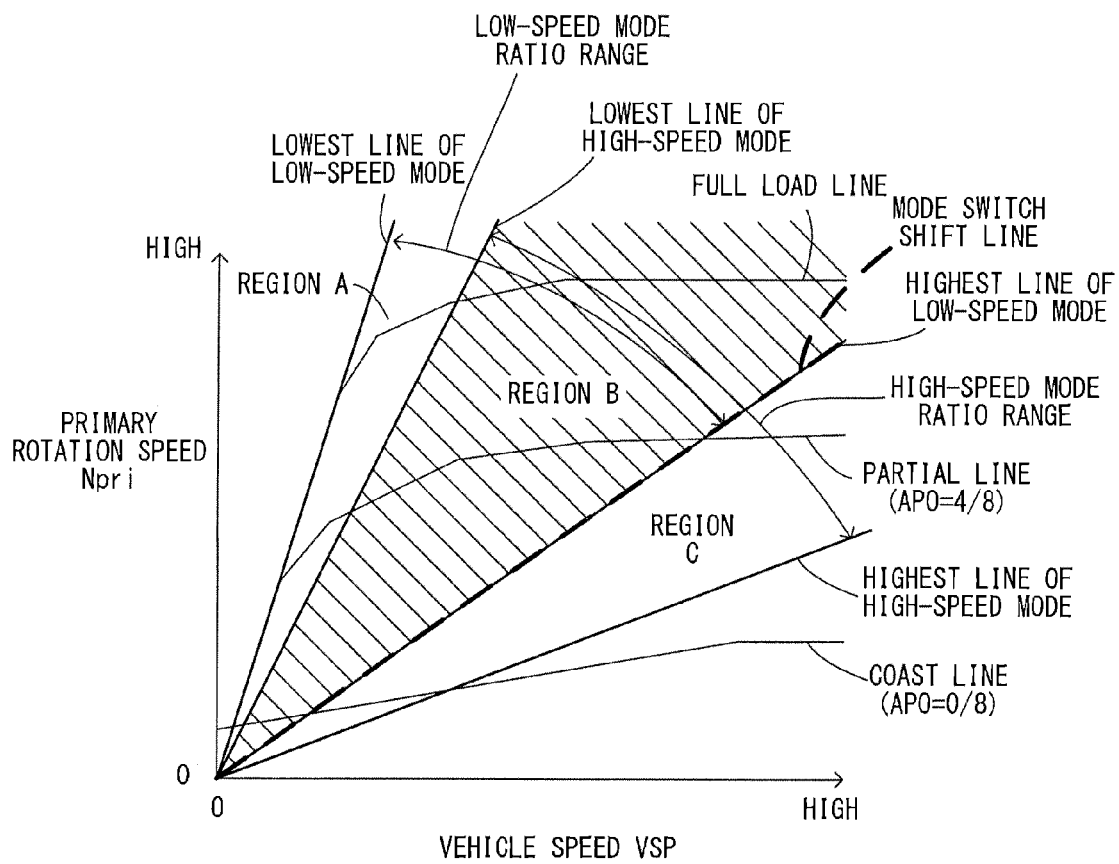
FIG. 3 shows one example of a shift map stored in a storage device.

FIG. 3 shows one example of a shift map stored in the storage device 122. The controller 12 controls the variator 20 and the auxiliary transmission mechanism 30 based on this shift map in accordance with drive conditions of the vehicle (in the present embodiment, a vehicle speed VSP, a primary rotation speed Npri, a secondary rotation speed Nsec, an accelerator pedal opening APO, and the like).

According to this shift map, an operating point of the transmission 4 is determined by the vehicle speed VSP and the primary rotation speed Npri. The inclination of a line connecting an operating point of the transmission 4 and a zero point at the lower left corner of the shift map corresponds to a speed ratio of the transmission 4 (an overall speed ratio obtained by multiplying a speed ratio of the variator 20 by a speed ratio of the auxiliary transmission mechanism 30, hereinafter referred to as a "through speed ratio"). On this shift map, a shift line is set for each accelerator pedal opening APO, similarly to a shift map of a conventional belt-type continuously variable transmission. Shift of the transmission 4 is performed in accordance with a shift line selected based on an accelerator pedal opening APO. For simplicity, FIG. 3 shows only a full load line (a shift line for the case of an accelerator pedal opening APO of 8/8), a partial line (a shift line for the case of an accelerator pedal opening APO of 4/8), and a coast line (a shift line for the case of an accelerator pedal opening APO of 0/8).

When the transmission 4 is in the low-speed mode, the transmission 4 can shift between the lowest line of the low-speed mode, which is obtained by setting the speed ratio of the variator 20 to the lowest speed ratio, and the highest line of the low-speed mode, which is obtained by setting the speed ratio of the variator 20 to the highest speed ratio. In this case, the operating point of the transmission 4 moves within region A and region B. On the other hand, when the transmission 4 is in the high-speed mode, the transmission 4 can shift between the lowest line of the high-speed mode, which is obtained by setting the speed ratio of the variator 20 to the lowest speed ratio, and the highest line of the high-speed mode, which is obtained by setting the speed ratio of the variator 20 to the highest speed ratio. In this case, the operating point of the transmission 4 moves within region B and region C.

A speed ratio of each gear position of the auxiliary transmission mechanism 30 is set such that a speed ratio corresponding to the highest line of the low-speed mode (the highest speed ratio in the low-speed mode) is lower than a speed ratio corresponding to the lowest line of the high-speed mode (the lowest speed ratio in the high-speed mode). Therefore, a range within which the through speed ratio of the transmission 4 could be performed in the low-speed mode (a "low-speed mode ratio range" in the figure) and a range within which the through speed ratio of the transmission 4 could be performed in the high-speed mode (a "high-speed mode ratio range" in the figure) partially overlap. When the operating point of the transmission 4 is in region B interposed between the lowest line of the high-speed mode and the highest line of the low-speed mode, the transmission 4 can select either the low-speed mode or the high-speed mode.

Also, on this shift map, a mode switch shift line for performing shift of the auxiliary transmission mechanism 30 is set to overlie the highest line of the low-speed mode. A through speed ratio corresponding to the mode switch shift line (hereinafter referred to as a "mode switch speed ratio mRatio") is set to a value equal to the highest speed ratio in the low-speed mode. The reason why the mode switch shift line is set in the foregoing manner is because a lower speed ratio of the variator 20 leads to input of smaller torque to the auxiliary transmission mechanism 30, which enables suppression of shift shock at the time of shift of the auxiliary transmission mechanism 30.

When the operating point of the transmission 4 crosses the mode switch shift line, that is to say, when an actual value of the through speed ratio (hereinafter referred to as an "actual through speed ratio Ratio") changes across the mode switch speed ratio mRatio, the controller 12 switches between the high-speed mode and the low-speed mode by performing coordinated shift, which will be described below.

In coordinated shift, the controller 12 performs shift of the auxiliary transmission mechanism 30, and changes the speed ratio of the variator 20 toward a direction opposite to a direction of a change in the speed ratio of the auxiliary transmission mechanism 30. At this time, an inertia phase in which the speed ratio of the auxiliary transmission mechanism 30 actually changes and a period in which the speed ratio of the variator 20 changes are brought into synchronization. The speed ratio of the variator 20 is changed toward a direction opposite to a direction of a change in the speed ratio of the auxiliary transmission mechanism 30 so that the driver does not feel a sense of discomfort caused by a change in the input rotation attributed to a stepwise difference in the actual through speed ratio Ratio.

Specifically, when the actual through speed ratio Ratio of the transmission 4 changes across the mode switch speed ratio mRatio from a low side to a high side, the controller 12 changes the gear position of the auxiliary transmission mechanism 30 from the first speed to the second speed (1-2 shift), and changes the speed ratio of the variator 20 toward a low side.

Conversely, when the actual through speed ratio Ratio of the transmission 4 changes across the mode switch speed ratio mRatio from a high side to a low side, the controller 12 changes the gear position of the auxiliary transmission mechanism 30 from the second speed to the first speed (2-1 shift), and changes the speed ratio of the variator 20 toward a high side.

When predetermined conditions are satisfied, the controller 12 executes idling stop control for stopping the engine 1 to improve fuel economy.

Figure 4:
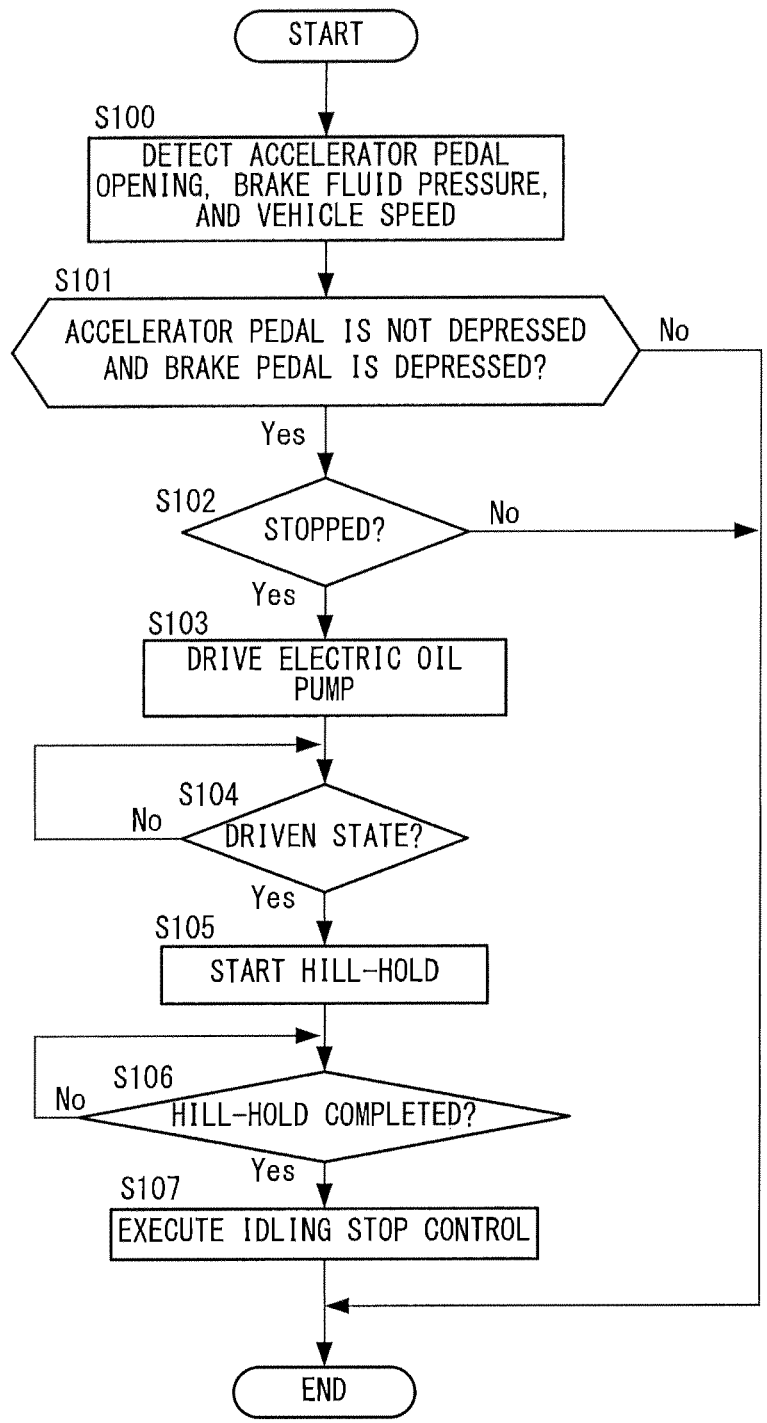
FIG. 4 is an explanatory flowchart of idling stop control according to the present embodiment.

A description is now given of the idling stop control according to the present embodiment with reference to a flowchart of FIG. 4.

In step S100, the controller 12 detects an accelerator pedal opening APO, a brake fluid pressure, and a vehicle speed VSP. The accelerator pedal opening APO is calculated based on an output signal from the accelerator pedal opening sensor 41. The brake fluid pressure is calculated based on an output signal from the brake fluid pressure sensor 46. The vehicle speed VSP is calculated based on an output signal from the vehicle speed sensor 43.

In step S101, the controller 12 determines whether or not the following condition is satisfied: the accelerator pedal is not depressed and the brake pedal is depressed. The controller 12 determines that the accelerator pedal is not depressed when the accelerator pedal opening APO is zero, and determines that the brake pedal is depressed when the brake fluid pressure is higher than a predetermined fluid pressure. The predetermined fluid pressure is a fluid pressure at which the driver can be determined to have an intention to slow down. The predetermined fluid pressure is set in advance. Processing proceeds to step S102 if the accelerator pedal is not depressed and the brake pedal is depressed. Processing ends if the accelerator pedal is depressed or the brake pedal is not depressed and is hence in a released state.

In step S102, the controller 12 determines whether or not the vehicle is stopped. The controller 12 determines that the vehicle is stopped when the vehicle speed VSP is zero. Processing proceeds to step S103 if the vehicle is stopped, and ends if the vehicle speed VSP is not zero, i.e., the vehicle is not stopped.

In step S103, the controller 12 starts driving of the electric oil pump 10*e*. The electric oil pump 10*e* is driven so as to be able to supply a hydraulic pressure necessary for the vehicle.

In step S104, the controller 12 determines whether or not the electric oil pump 10*e* is in a driven state. Processing proceeds to step S105 if the electric oil pump 10*e* is in the driven state. The driven state denotes a state in which the electric oil pump 10*e* is able to supply a hydraulic pressure necessary for the vehicle. The controller 12 determines that the electric oil pump 10*e* is in the driven state when a discharge pressure of the electric oil pump 10*e* has become equal to or higher than a predetermined pressure after driving of the electric oil pump 10*e* was started in step S103. The predetermined pressure, which is set in advance, is a pressure that enables the electric oil pump 10*e* to supply a hydraulic pressure necessary for the vehicle.

In step S105, the controller 12 starts hill-hold. The hill-hold is a braking method for blocking a hydraulic pressure passage for adjusting a brake fluid pressure in a state where the vehicle is generating a braking force due to depression of the brake pedal. With this method, even if the brake pedal is thereafter placed in a released state due to cancellation of depression of the brake pedal, the vehicle generates a predetermined braking force. The hill-hold lasts for a first predetermined time period after depression of the brake pedal is cancelled. The predetermined braking force and the first predetermined time period are set in advance such that, even if depression of the brake pedal is cancelled to start the vehicle stopped on a climbing road, the vehicle is suppressed from rolling down and is able to start smoothly.

A brake system according to the present embodiment is not a by-wire brake system, but is a brake system in which a change in an amount of depression of the brake pedal is supplied to a hydraulic pressure chamber of a brake as a change in the brake fluid pressure. In this brake system, a hydraulic pressure passage and a valve for opening and closing the hydraulic pressure passage are provided between the brake pedal and the hydraulic pressure chamber of the brake, and the hill-hold is performed by controlling the valve.

In step S106, the controller 12 determines whether or not the hill-hold is completed. The controller 12 determines that the hill-hold is completed when a predetermined closing time period has elapsed since a valve for adjusting the brake fluid pressure started to be closed in step S105. The predetermined closing time period, which is set in advance, is a time period necessary for closing the valve for adjusting the brake fluid pressure. Processing proceeds to step S107 upon completion of the hill-hold.

In step S107, as predetermined conditions for executing the idling stop control are satisfied, the controller 12 executes the idling stop control. In the present embodiment, the predetermined conditions are as follows: (1) the accelerator pedal is not depressed, (2) the brake pedal is depressed, (3) the vehicle is stopped, (4) the electric oil pump 10*e* is in the driven state, and (5) the hill-hold is completed. The predetermined conditions may include other conditions, such as the lowest speed ratio and an appropriate oil temperature.

The idling stop control is not executed when any of the predetermined conditions is not satisfied. The idling stop control is ceased when any of the predetermined conditions is no longer satisfied during the idling stop control.

A further description of the idling stop control according to the present embodiment will now be provided.

Figure 5:
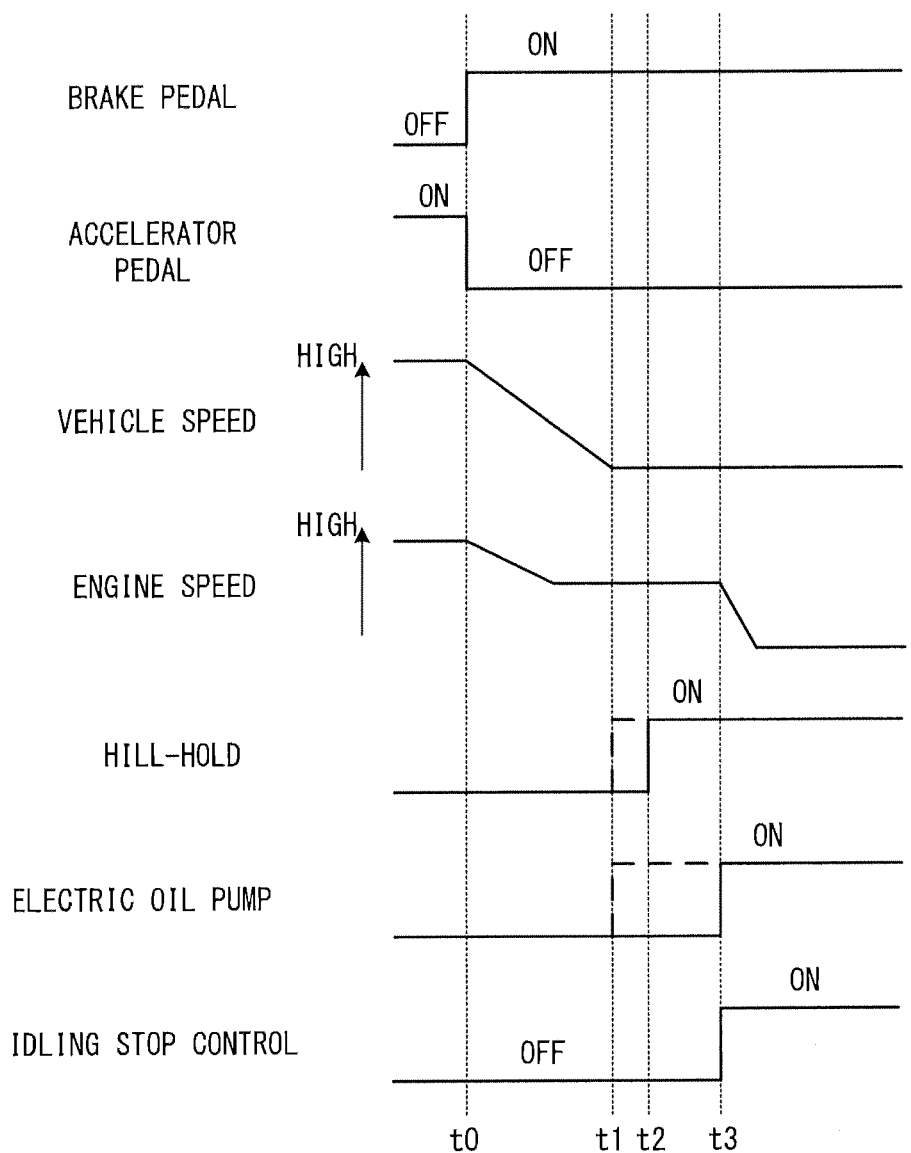
FIG. 5 is a time chart for a case in which the present embodiment is not adopted.

First, a description is given of a case in which the present embodiment is not adopted with reference to a time chart of FIG. 5. In a case where the present embodiment is not adopted, driving of the electric oil pump 10*e* and the hill-hold are started simultaneously.

At time t0, depression of the accelerator pedal is cancelled, and the brake pedal is depressed. As a result, the vehicle speed VSP decreases.

When the vehicle speed VSP reaches zero and the vehicle comes to a stop at time t1, driving of the electric oil pump 10*e* and the hill-hold are started. A driving instruction for the electric oil pump 10*e* and a start instruction for the hill-hold are indicated by dash lines (the same is true in the following description).

Although driving of the electric oil pump 10*e* and the hill-hold are started simultaneously at time t1, a time period until the electric oil pump 10*e* is placed in the driven state differs from a time period until the hill-hold is completed. Comparing the time period until the electric oil pump 10*e* is placed in the driven state with the time period until the hill-hold is completed, the latter is shorter than the former.

Therefore, the hill-hold is completed at time t2, and the electric oil pump 10e is placed in the driven state at time t3. As the predetermined conditions for executing the idling stop control are satisfied at time t3, the idling stop control is executed at time t3. Consequently, fuel injection to the engine 1 is ceased, and the engine speed decreases to zero.

Figure 6:
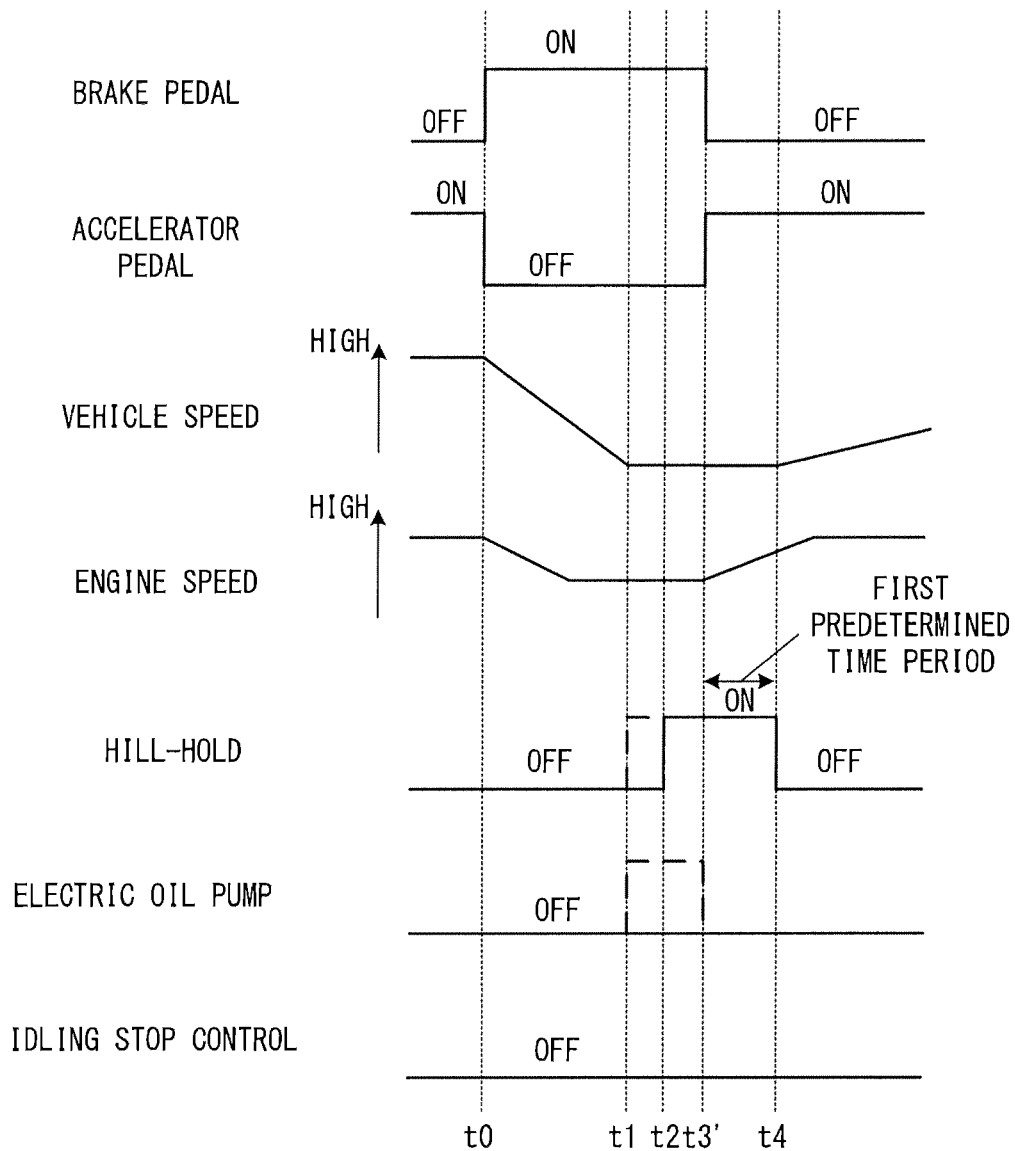
FIG. 6 is a time chart for a case in which the present embodiment is not adopted.

With reference to FIG. 6, the following describes a case in which the driver depresses the accelerator pedal to start the vehicle between time t2 and time t3 of FIG. 5 without adopting the present embodiment. A part of FIG. 6 up to time t2 is the same as that of FIG. 5, and a description thereof is omitted here.

Even if the accelerator pedal is depressed to start the vehicle at time t3', as the hill-hold is completed, the vehicle generates a braking force due to the hill-hold until the first predetermined time period elapses since depression of the brake pedal was cancelled. As a result, startability of the vehicle declines.

At time t4, the first predetermined time period elapses since depression of the brake pedal was cancelled, and the hill-hold is deactivated. Consequently, the vehicle accelerates in response to depression of the accelerator pedal.

Figure 7:
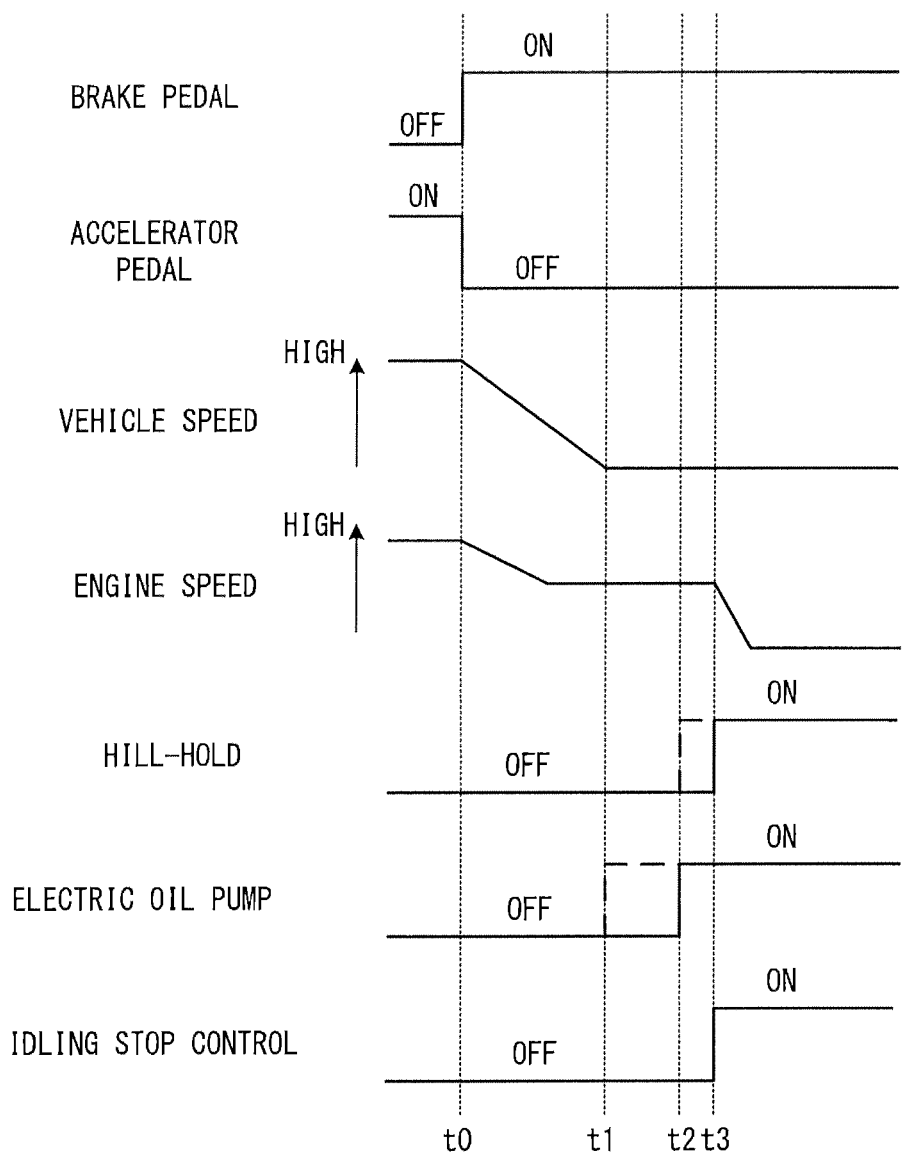
FIG. 7 is a time chart for a case in which the present embodiment is adopted.

Next, a description is given of a case in which the idling stop control according to the present embodiment is executed with reference to FIG. 7.

At time t0, depression of the accelerator pedal is cancelled, and the brake pedal is depressed. As a result, the vehicle speed VSP decreases.

When the vehicle speed VSP reaches zero and the vehicle comes to a stop at time t1, driving of the electric oil pump 10e is started. In the present embodiment, the hill-hold is not started yet.

When the electric oil pump 10e is placed in the driven state at time t2, the hill-hold is started.

Upon completion of the hill-hold at time t3, the idling stop control is executed.

Figure 8:
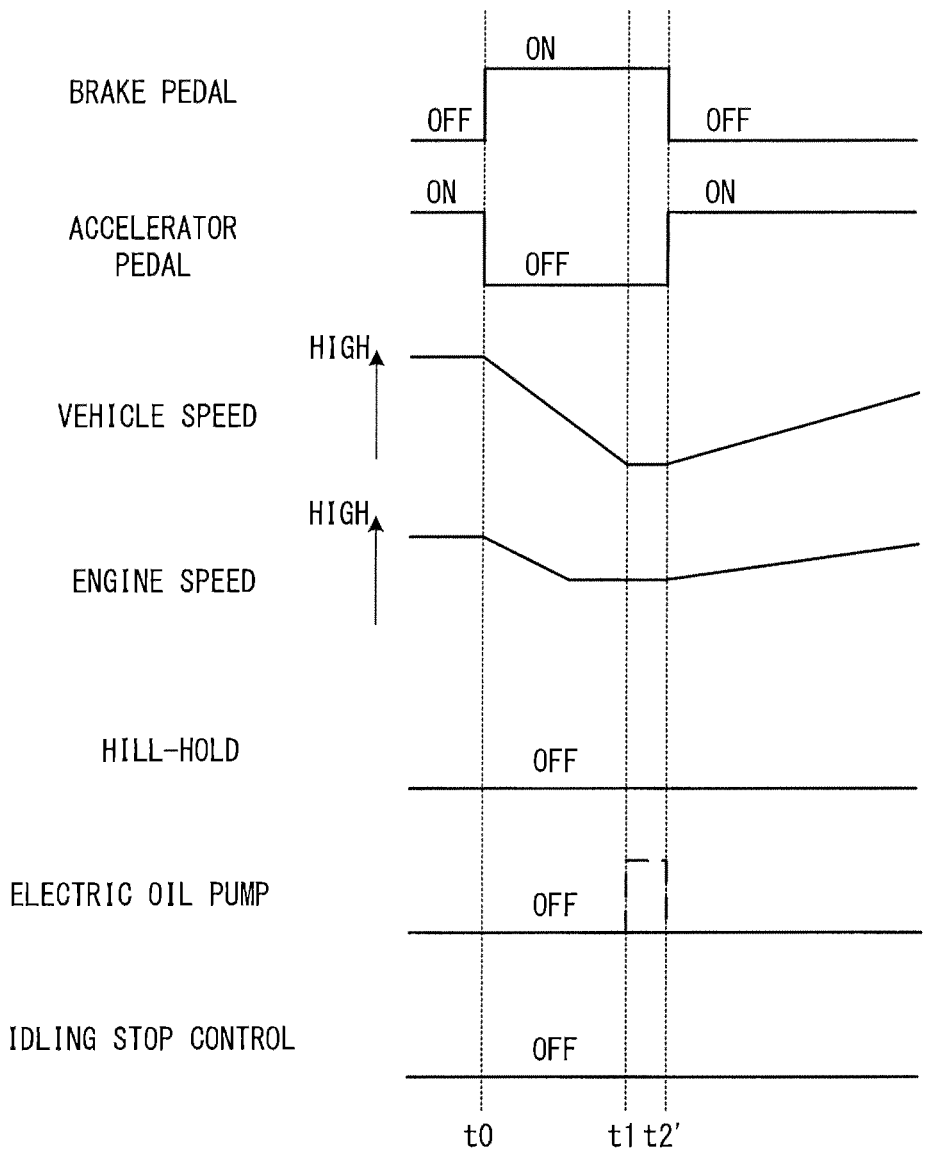
FIG. 8 is a time chart for a case in which the present embodiment is adopted.

With reference to FIG. 8, the following describes a case in which the driver depresses the accelerator pedal to start the vehicle between time t1 and time t2 of FIG. 7 while adopting the present embodiment. A part of FIG. 8 up to time t1 is the same as that of FIG. 7, and a description thereof is omitted here.

When the accelerator pedal is depressed at time t2', the hill-hold is not started yet, and therefore the vehicle is not generating a braking force attributed to the hill-hold. The vehicle hence starts and accelerates in response to depression of the accelerator pedal. In the present embodiment, a timing for starting the hill-hold is delayed. Therefore, after the vehicle comes to a stop, if the accelerator pedal is depressed before the idling stop control is started, the vehicle can start in response to depression of the accelerator pedal.

The advantageous effects of the embodiment of the present invention will now be described.

If the driver cancels depression of the brake pedal during the idling stop control, the engine 1 is initiated again. Once the engine 1 has been initiated, a discharge pressure of the mechanical oil pump 10m becomes high, one of the friction engagement elements 32 to 34 is engaged by a hydraulic pressure supplied by the mechanical oil pump 10m, and a driving force is transmitted to the drive wheels 7. Consequently, the vehicle starts. However, there is a lag between cancellation of depression of the brake pedal and engagement of one of the friction engagement elements 32 to 34 by the hydraulic pressure supplied by the mechanical oil pump 10m. For this reason, if the vehicle is stopped on a climbing road, the vehicle rolls down during the lag. Although a hydraulic pressure is supplied by the electric oil pump 10e until the discharge pressure of the mechanical oil pump 10m becomes high, a discharge pressure of the electric oil pump 10e is not as high as the discharge pressure of the mechanical oil pump 10m, and it is not possible to supply a hydraulic pressure that engages one of the friction engagement elements 32 to 34 so that the vehicle does not roll down. In order to suppress the vehicle from rolling down in this way, the hill-hold is performed for the first predetermined time period after depression of the brake pedal is cancelled.

If a start request is issued by depression of the accelerator pedal by the driver before the elapse of the first predetermined time period, a decline in startability of the vehicle in response to the start request from the driver can be suppressed by deactivating the hill-hold without waiting for the elapse of the first predetermined time period.

However, a braking force attributed to the hill-hold is cleared after the elapse of a sum total of a time period for determining the deactivation of the hill-hold and a time period of operation of deactivating the hill-hold (e.g., a time period in which a valve is opened and closed). Therefore, even though the accelerator pedal is depressed, startability of the vehicle declines due to the action of the braking force attributed to the hill-hold. Whether or not to deactivate the hill-hold is determined based on, for example, a signal from the brake fluid pressure sensor 46. It is determined that the hill-hold is to be deactivated if an OFF state of the signal from the brake fluid pressure sensor 46 lasts for a certain time period.

In the present embodiment, until the vehicle comes to a stop and the electric oil pump 10e is placed in the driven state, the hill-hold is not performed because the action of a braking force corresponding to depression of the brake pedal is in effect. A braking force attributed to depression of the brake pedal is generated and decreases in accordance with depression of the brake pedal. As such, this braking force is rarely delayed relative to operation on the brake pedal and has a small influence on startability of the vehicle. Accordingly, as the driver places the brake pedal in a released state with an intention to start the vehicle, the braking force starts to decrease, thereby improving startability of the vehicle.

Even after the vehicle comes to a stop, the engine 1 is driven due to injection of fuel thereto until the execution of the idling stop control, and therefore the mechanical oil pump 10m supplies a hydraulic pressure necessary for the vehicle. Therefore, in a case where a stopped vehicle is to be started before the execution of the idling stop control, a hydraulic pressure that is necessary for starting the vehicle can be immediately supplied to the variator 20 and the like. The driver hence expects the vehicle to start promptly in response to a start request. In this case, when depression of the brake pedal is cancelled, the braking force generated by depression of the brake pedal is cleared. However, if the braking force attributed to the hill-hold is generated in the vehicle, startability of the vehicle declines for the first predetermined time period after depression of the brake pedal is cancelled in response to the start request from the driver, and further for the above-described sum total of time periods.

In the present embodiment, in a case where the idling stop control is executed, the hill-hold is started after the electric oil pump 10e is placed in the driven state. In this way, after the vehicle comes to a stop, a timing at which the braking force attributed to the hill-hold is generated in the vehicle is delayed. By delaying a timing for starting the hill-hold, a time period in which the braking force is generated due to the hill-hold can be shortened before the execution of the idling stop control. Therefore, a decline in vehicle startability can be suppressed in a case where a stopped vehicle is to be started before the idling stop control is executed, specifically, before the hill-hold is started.

While the hill-hold is performed by closing a valve for adjusting a brake fluid pressure, a time period necessary for closing the valve is short. Therefore, even if the hill-hold is started after the electric oil pump 10e is placed in the driven state, there is no significant delay in time to execute the idling stop control.

The electric oil pump 10e is determined to be in the driven state when a discharge pressure of the electric oil pump 10e becomes equal to or higher than a predetermined pressure after driving of the electric oil pump 10e is started. This makes it possible to accurately determine that the electric oil pump 10e is driven.

The controller 12 may determine that the electric oil pump 10e is in the driven state when a second predetermined time period or longer has passed since the start of driving of the electric oil pump 10e. The second predetermined time period, which is set in advance, is a time period that enables the electric oil pump 10e to supply a hydraulic pressure necessary for the vehicle. This makes it possible to accurately determine that the electric oil pump 10e is placed in the driven state, even when the line pressure sensor 44 is abnormal or the line pressure sensor 44 is not provided.

While the engine 1 is used as the drive source in the above-described embodiment, no limitation is intended in this regard. A motor or a combination of an engine and a motor may be used as the drive source.

While the above-described embodiment has discussed the vehicle including the transmission 4, no limitation is intended in this regard. The above-described embodiment may be applied to a step transmission, a dual-clutch transmission, and the like.

A magnitude of the braking force of the vehicle during the hill-hold may change in accordance with time. For example, the braking force of the vehicle may increase as time elapses, and the braking force of the vehicle may increase in a stepwise manner in accordance with elapse of time.

This concludes the description of the embodiment of the present invention. It should be noted that the above-described embodiment merely illustrates a part of application examples of the present invention, and is not intended to limit a technical scope of the present invention to specific configurations of the above-described embodiment.

The present application claims the benefit of priority from Japanese Patent Application No. 2012-131722, filed in the Japan Patent Office on Jun. 11, 2012, the disclosure of which is incorporated herein by reference in its entirety.

The invention claimed is:

1. A vehicle control device for controlling a vehicle that has an electric oil pump and executes idling stop control for stopping a drive source when predetermined conditions are satisfied, the vehicle control device comprising:
   a controller configured to
      determine whether or not the vehicle is stopped;
      determine whether or not the electric oil pump is driven;
      perform a hill-hold, the hill-hold continuously applying a braking force generated by depression of a brake pedal to the vehicle when the brake pedal that has been depressed to generate the braking force in the vehicle is released; and
      execute the idling stop control after the hill-hold is started based on a condition that the controller determines that the vehicle is stopped and the controller determines that the electric oil pump is driven and the braking force, in a case where the brake pedal is released, is applied to the vehicle by starting of the hill-hold,
   wherein the idling stop control ceases a fuel supply to the drive source to stop the drive source.

2. The vehicle control device according to claim 1, wherein
   the controller is configured to determine that the electric oil pump is driven when a discharge pressure of the electric oil pump has become equal to or higher than a predetermined pressure after initiation of the electric oil pump, the predetermined pressure enabling supply of a hydraulic pressure necessary for the vehicle.

3. The vehicle control device according to claim 1, wherein
   the controller is configured to determine that the electric oil pump is driven when a time period from initiation of the electric oil pump has become equal to or longer than a second predetermined time period.

4. A vehicle control method for controlling a vehicle that has an electric oil pump, executes idling stop control for stopping a drive source when predetermined conditions are satisfied, and is capable of applying a braking force in a state in which a brake pedal is released, wherein a controller
   determines whether or not the vehicle is stopped,
   determines whether or not the electric oil pump is driven,
   when a brake pedal that has been depressed to generate a braking force in the vehicle is released, performs a hill-hold, the hill-hold continuously applying the braking force generated by depression of the brake pedal to the vehicle, and
   executes the idling stop control after the hill-hold is started based on a condition that a stop of the vehicle is determined and the electric oil pump is determined to be driven and the braking force, in a case where the brake pedal is released, is applied to the vehicle by starting of the hill-hold,
   wherein the idling stop control ceases a fuel supply to the drive source to stop the drive source.

5. A vehicle control device for controlling a vehicle that has an electric oil pump and executes idling stop control for stopping a drive source when predetermined conditions are satisfied, the vehicle control device comprising:
   control means for
      determining whether or not the vehicle is stopped;
      determining whether or not the electric oil pump is driven;
      when a brake pedal that has been depressed to generate a braking force in the vehicle is released, performing a hill-hold, the hill-hold continuously applying the braking force generated by depression of the brake pedal to the vehicle; and
      executing the idling stop control after the hill-hold is started based on a condition that the vehicle is determined to be stopped and the electric oil pump is determined to be driven and the braking force, in a case where the brake pedal is released, is applied to the vehicle by starting of the hill-hold,
   wherein the idling stop control ceases a fuel supply to the drive source to stop the drive source.

* * * * *